United States Patent
Rowa (10) Patent No.: US 10,894,472 B2
(45) Date of Patent: Jan. 19, 2021

(54) POWER SPLIT HYBRID POWERTRAIN

(71) Applicant: BAE SYSTEMS HÄGGLUNDS AKTIEBOLAG, Örnsköldsvik (SE)

(72) Inventor: Andreas Rowa, Bonässund (SE)

(73) Assignee: BAE SYSTEMS HÄGGLUNDS AKTIEBOLAG, Örnskölds Vik (SE)

(*) Notice: Subject to any disclaimer, the term of this patent is extended or adjusted under 35 U.S.C. 154(b) by 50 days.

(21) Appl. No.: 16/346,477

(22) PCT Filed: Oct. 18, 2017

(86) PCT No.: PCT/SE2017/051026
§ 371 (c)(1),
(2) Date: Apr. 30, 2019

(87) PCT Pub. No.: WO2018/084766
PCT Pub. Date: May 11, 2018

(65) Prior Publication Data
US 2019/0275877 A1    Sep. 12, 2019

(30) Foreign Application Priority Data
Nov. 1, 2016    (SE) ...................... 1651442

(51) Int. Cl.
*B60K 6/365* (2007.10)
*B60K 6/445* (2007.10)
(Continued)

(52) U.S. Cl.
CPC ............... *B60K 6/445* (2013.01); *B60K 1/02* (2013.01); *B60K 6/365* (2013.01); *B60K 6/387* (2013.01);
(Continued)

(58) Field of Classification Search
CPC ........ B60K 6/365; B60K 6/445; B60K 6/387; B60K 1/02; B60W 20/40
See application file for complete search history.

(56) References Cited

U.S. PATENT DOCUMENTS 5,775,449 A * 7/1998 Moroto ................. B60K 6/365
 180/65.235
8,292,012 B2 * 10/2012 Sowul .................... B60K 6/442
 180/65.265
(Continued)

FOREIGN PATENT DOCUMENTS

DE  102011085198 A1 * 5/2013 ............. F16H 3/725
WO  WO-2018169463 A1 * 9/2018 ............. B60W 10/08

OTHER PUBLICATIONS

Office Action received for Swedish Patent Application No. 1651442-4, dated May 4, 2017, 5 pages.
(Continued)

*Primary Examiner* — Sherry L Estremsky
(74) *Attorney, Agent, or Firm* — Morrison and Foerster LLP (57) ABSTRACT

The present invention relates to a hybrid powertrain for a vehicle. The hybrid powertrain comprising: an internal combustion engine; a torque converter; a first and a second electric machine electrically coupled to each other. The hybrid powertrain further comprises a planetary gear set, comprising a first, a second and a third member. The internal combustion engine is mechanically engaged to the second member of the planetary gear set via the torque converter. The first electric machine is arranged mechanically engaged to the first member of the planetary gear set. The second electric machine is arranged mechanically engagable to the second and third member of the planetary gear set so as to establish a plurality of operating modes of the hybrid powertrain.

16 Claims, 6 Drawing Sheets

(51) Int. Cl.

| | | |
|---|---|---|
| *B60W 20/40* | (2016.01) | |
| *B60W 10/04* | (2006.01) | |
| *B60K 6/50* | (2007.10) | |
| *B60W 10/02* | (2006.01) | |
| *B60W 10/10* | (2012.01) | |
| *B60W 10/08* | (2006.01) | |
| *B60K 1/02* | (2006.01) | |
| *B60K 6/387* | (2007.10) | |
| *B60K 6/48* | (2007.10) | |
| *B60W 20/10* | (2016.01) | |
| *B60W 10/06* | (2006.01) | |

(52) U.S. Cl.
    CPC .............. *B60K 6/48* (2013.01); *B60K 6/50* (2013.01); *B60W 10/02* (2013.01); *B60W 10/04* (2013.01); *B60W 10/06* (2013.01); *B60W 10/08* (2013.01); *B60W 10/10* (2013.01); *B60W 20/10* (2013.01); *B60W 20/40* (2013.01); *B60Y 2200/92* (2013.01); *F16H 2200/2005* (2013.01)

(56) References Cited

U.S. PATENT DOCUMENTS

| | | | | |
|---|---|---|---|---|
| 8,583,335 | B2* | 11/2013 | Ota | B60W 20/13 |
| | | | | 701/58 |
| 8,696,506 | B2* | 4/2014 | Kaltenbach | B60K 6/387 |
| | | | | 475/5 |
| 8,734,281 | B2 | 5/2014 | Ai et al. | |
| 9,810,190 | B2* | 11/2017 | Wang | F02D 29/02 |
| 10,124,796 | B2* | 11/2018 | Morita | B60L 50/51 |
| 10,195,930 | B2* | 2/2019 | Endo | B60W 20/40 |
| 10,479,350 | B2* | 11/2019 | Bjorkman | B60K 6/387 |
| 10,525,816 | B2* | 1/2020 | Imamura | B60W 20/20 |
| 2008/0039257 | A1 | 2/2008 | Holmes | |
| 2008/0195286 | A1 | 8/2008 | Tabata et al. | |
| 2010/0029429 | A1 | 2/2010 | Ota | |
| 2012/0116622 | A1* | 5/2012 | Kim | F16H 59/46 |
| | | | | 701/22 |
| 2012/0316021 | A1* | 12/2012 | Kim | F16H 3/728 |
| | | | | 475/5 |
| 2015/0099605 | A1 | 4/2015 | Choi et al. | |
| 2015/0292608 | A1 | 10/2015 | Mckinzie | |
| 2019/0351894 | A1* | 11/2019 | Nakagawara | B60W 10/02 |

OTHER PUBLICATIONS

Swedish Search Report received for Swedish Patent Application No. 1651442-4, dated Nov. 1, 2016, 2 pages.

International Search Report received for PCT Patent Application No. PCT/SE2017/051026, dated Jan. 3, 2018, 4 pages.

International Preliminary Report on Patentability received for PCT Patent Application No. PCT/SE2017/051026, dated Jan. 3, 2018, 5 pages.

Extended European Search Report received for European Patent Application No. 17868395.9, dated May 4, 2020, 9 pages.

* cited by examiner

| Mode | C1 | C2 |
|---|---|---|
| Mode 1 | ● | ● |
| Mode 2 | ● | ○ |
| Mode 3 | ○ | ○ |
| Mode 4 | ○ | ● |

POWER SPLIT HYBRID POWERTRAIN

CROSS REFERENCE TO RELATED APPLICATIONS

This application is a U.S. National Phase patent application under 35 U.S.C. § 371 of PCT/SE2017/051026, filed Oct. 18, 2017, which claims priority to Sweden Patent Application No. SE 1651442-4, filed Nov. 1, 2016, the disclosures of which are incorporated herein by reference in their entirety.

TECHNICAL FIELD

The present invention relates to a hybrid powertrain for a vehicle. The present invention also relates to a vehicle.

BACKGROUND ART

Implementing hybrid drive or hybrid powertrain for vehicles have recently became popular due to for example its fuel conservative nature. Numerous configurations of hybrid drives for vehicles exist today.

One example of a type of hybrid powertrain is a series hybrid powertrain which can be implemented in a number of ways. However, a problem with a hybrid powertrain of series type is that it is poorly suited for implementation in heavy vehicles. Implementing a hybrid powertrain of series type in a heavy vehicle typically requires powerful and large electric machines together with numerous power electronic components which results in a heavy, costly and complex configuration.

Other examples of types of hybrid powertrains are parallel or series/parallel hybrid powertrains. A variant of the series/parallel hybrid power train is the power split hybrid which today is a common hybrid powertrain of automobiles. The power split hybrid is thus well known. However, none of the variants of the power split hybrid powertrains are well adapted for heavy vehicles which due to the nature of the heavy vehicles such as weight and operating requirements need a high capacity in terms of speed/torque. There exists power split hybrid powertrains configured with improved capacity in terms of speed/torque but they typically require numerous gear components and components associated thereto resulting in a complex and space consuming configuration of the powertrain.

Thus, there exists a need to present improvement within hybrid powertrains for vehicles such as heavy vehicles.

OBJECTS OF THE INVENTION

An object of the present invention is to provide a hybrid powertrain for a vehicle which facilitates operation of a heavy vehicle.

An additional object of the present invention is to provide a hybrid powertrain for a vehicle which provides a plurality of operational modes.

SUMMARY OF THE INVENTION

These and other objects, apparent from the following description, are achieved by a hybrid powertrain for a vehicle, a method for operating a hybrid powertrain and a vehicle as set out in the appended independent claims. Preferred embodiments of the method and the hybrid powertrain are defined in appended dependent claims.

According to the invention the objects are achieved by a hybrid powertrain for a vehicle. The hybrid powertrain comprises an internal combustion engine, a torque converter and a first and a second electric machine, wherein the first and second electric machines are electrically coupled to each other. The hybrid powertrain further comprise a planetary gear set. The planetary gear set comprises a first, a second and a third member. The internal combustion engine is mechanically engaged to the second member of the planetary gear set via the torque converter. The first electric machine is arranged mechanically engaged to the first member of the planetary gear set. The second electric machine is arranged mechanically engagable to the second and third member of the planetary gear set so as to establish a plurality of operational modes of the hybrid powertrain.

Hereby is achieved a simple configuration of a hybrid powertrain that can provide sufficient torque over a speed range suitable for implementation in a heavy vehicle. Furthermore, the hybrid powertrain can be implemented using less powerful electric machines, i.e. implemented with electric machines delivering lower electrical power than required by traditional hybrid powertrains. This also results in that the power electronics associated with the electric machines can have lower power requirements than required by traditional hybrid powertrains. The hybrid powertrain also require less space once installed than traditional hybrid powertrains since it can be implemented using relatively few components, typically traditional hybrid powertrains for high torque applications, i.e. heavy vehicles, require complex configurations in terms of gearing components such as for example multi-stage planetary gear sets and numerous clutches. This also results in lower weight and a lower cost in terms of production and maintenance since fewer and more cost efficient components are required by the hybrid powertrain according to the invention. Also the hybrid powertrain do not require slipping when switching between operational modes, i.e. slipping clutches such as friction disc clutches, which for example conventional automatic gearboxes and 2-speed or multi speed series type hybrid powertrains typically requires when switching gears.

According to an embodiment of the hybrid powertrain entry into one or more operational modes of the plurality of operational modes of the hybrid powertrain are caused by engaging the second electric machine to the second and/or third member of the planetary gear set.

According to an embodiment of the hybrid powertrain the second electric machine is arranged mechanically engagable to the third member of the planetary gear set via a first clutch and arranged mechanically engagable to the second member of the planetary gear set via a second clutch.

According to an embodiment of the hybrid powertrain the first member of the planetary gear set is a ring gear, the second member is a carrier shaft and the third member is a sun gear.

According to an embodiment of the hybrid powertrain the third member of the planetary is coupled to an output member for transferring of a driving torque from the hybrid powertrain to the vehicle. By means of the above mentioned coupling of the electric machines to the planetary gear set, which constitutes a power split stage, and the coupling of the output from the sun gear results in the possibility to selectively disconnect/connect the electric machines from the output shaft of the planetary gear set, drawn via the sun gear, which has a big impact of the transmission characteristics of the hybrid powertrain. This for example results in that the maximum allowed speed (rpm) of the electric machines is not a factor limiting the maximum speed of the vehicle in which the hybrid powertrain is to be implemented.

According to an embodiment of the hybrid powertrain each of the first and second electric machines is configured to selectively be used as motor or generator.

According to an embodiment of the hybrid powertrain the plurality of operational modes comprises a first operational mode, caused by engaging the first and second clutches, wherein the planetary gear set is arranged to rotate as single unit, the first operational mode correspond to a torque converter supported internal combustion engine only operational mode.

According to an embodiment of the hybrid powertrain the plurality of operational modes comprises a second operational mode, caused by engaging the first clutch and disengaging the second clutch, wherein the first electric machine is arranged to operate as a generator and the second electric machine is arranged to operate as an motor, and wherein the planetary gear set is arranged to operate substantially as a differential gear, the second operational mode correspond to a combined internal combustion engine and electric machine operational mode.

According to an embodiment of the hybrid powertrain the plurality of operating modes comprises a third operating mode caused by disengaging the first and second clutches, wherein the planetary gear set is arranged to operate substantially as a differential gear, the third operational mode correspond to an electric machine assisted internal combustion engine only operational mode.

According to an embodiment of the hybrid powertrain the plurality of operational modes comprises a fourth operational mode caused by disengaging the first clutch and engaging the second clutch wherein the first electric machine is arranged to operate as a motor and the second electric machine is arranged to operate as a generator, and wherein the planetary gear set is arranged to operate substantially as a differential gear, the fourth operational mode correspond to a combined internal combustion engine and electric machine operational mode.

According to an embodiment the hybrid powertrain comprises a power source.

Hereby is achieved a hybrid powertrain wherein a power source such as a battery device can be used for energy storage for storing of excess energy generated by one of the electric machines when operating as a generator. Furthermore, the electrical energy stored in the power source can be used for generating additional mechanical power by means of conversion by one or more of the first and second electrical machines.

According to an embodiment of the hybrid powertrain the planetary gear set is a single planetary gear set.

Hereby is achieved a simple construction which is space conservative, cheap, light weight and easy to maintain. Typically hybrid powertrains for heavy vehicles according to prior art comprises a plurality of planetary gear sets where one or more of the planetary gear sets are multi-stage planetary gear sets or other types of non-conventional planetary gear sets.

According to an embodiment of the hybrid powertrain the torque converter comprises a lock up mechanism so as to allow selective use of the torque converter.

Hereby is achieved that use of the torque converter can be controlled so as to enable/disable the torque converter.

According to the invention the objects are also achieved by a method for operating a hybrid powertrain of the type stated above. The method comprises the steps of: engaging the second electric machine to the second and third member of the planetary gear set causing entry into a first operational mode, wherein the planetary gear set rotates as single unit, the first operational mode corresponding to a torque converter supported internal combustion engine only operational mode; engaging the second electric machine to the third member of the planetary gear set and disengaging the second electric machine from the second member of the planetary gear set causing entry into a second operational mode, wherein the planetary gear set substantially operates as a differential gear, and wherein the first electric machine operates as a generator and the second electric machine operates as a motor, the second operational mode corresponding to a combined internal combustion engine and electric machine operational mode; disengaging second electric machine from the second and third member of the planetary gear set causing entry into a third operational mode, wherein the planetary gear set substantially operates as a differential gear, and, the third operational mode corresponding to an electric machine assisted internal combustion engine only operational mode; and disengaging the second electric machine from the third member of the planetary gear set and engaging the second electric machine to the second member of the planetary gear set causing entry into a fourth operational mode, wherein the planetary gear set substantially operate as a differential gear, and wherein the first electric machine operates as a motor and the second electric machine operates as a generator, the fourth operational mode corresponding to a combined internal combustion engine and electric machine operational mode.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Figure 1:
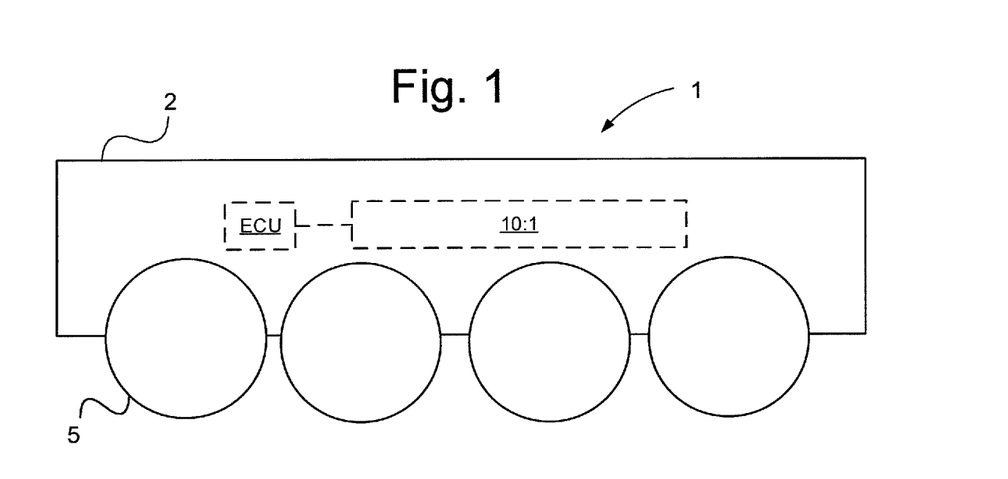
FIG. 1 schematically illustrates a side view of a vehicle with a hybrid powertrain according to an embodiment of the present invention.

FIG. 1 schematically illustrates an exemplary embodiment of a vehicle 1, in the form of a ground vehicle, comprising a hybrid powertrain 10:1 comprised in a vehicle body 2 of the vehicle 1. The hybrid powertrain is arranged for propulsion of the vehicle. The vehicle also comprises a vehicle frame (not shown) for supporting the vehicle body, the hybrid powertrain and various other vehicle systems which for example may include an operator station. The vehicle further comprises at least one drive assembly, such as drive assembly DA shown in FIG. 2, for driving one or more ground engaging means 5 of the vehicle. When the ground engaging means receive a controlled driving torque from the hybrid powertrain via the at least one drive assembly the vehicle can be caused to move controllably relative to the ground as desired by for example an operator of the vehicle. For example the vehicle may be driven backwards, forwards or remain stationary. Although the ground engaging means 5, in FIG. 1, are exemplified as four sets of wheels other ground engaging means may easily be contemplated such as for example a set of endless tracks or a different number of sets of wheels.

It should further be noted that the vehicle 1 as described above may comprise a hybrid powertrain of a slightly different configuration than the hybrid powertrain 10:1 as described in more detail with reference to FIG. 2. For example the vehicle may comprise a hybrid powertrain configured in accordance to the hybrid powertrain described with reference to FIG. 5.

The vehicle further comprises at least one electronic control unit ECU for control of at least the hybrid powertrain and/or components thereof. For example the ECU may be arranged for, steering, throttle and transmission control. The ECU may further comprise or be coupled to one or more vehicle sensors so as to enable obtaining various data about the vehicle required for control of the hybrid powertrain.

The vehicle 1 preferably is a military tracked or wheeled heavy vehicle such as a vehicle selected from a group of military vehicles comprising tanks, armoured personnel carriers or infantry fighting vehicles.

By the term heavy vehicles is meant a vehicle that weighs around 10 000 kg or more.

According to a variant the vehicle 1 is a civilian tracked or wheeled heavy vehicle such as a vehicle selected from a group of civilian vehicles comprising working type vehicles such as: tractors, mining vehicles, construction vehicles, public transportation vehicles such as buses, towing vehicles or transportation vehicles such as trucks.

Figure 2:
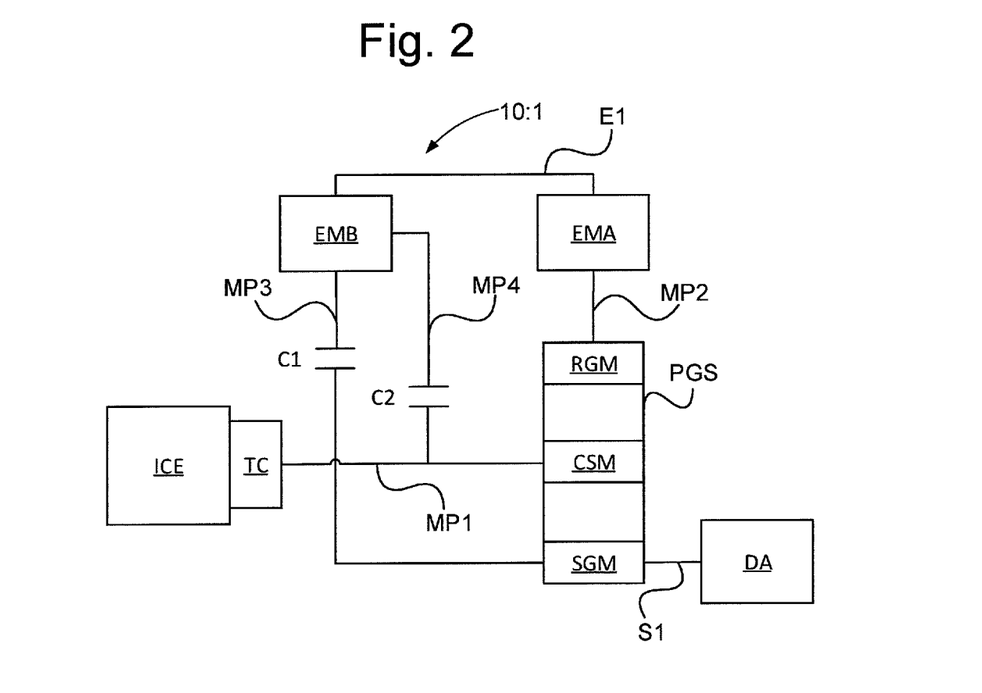
FIG. 2 schematically illustrates schematics of a hybrid powertrain of a vehicle according to an embodiment of the present invention.

FIG. 2 schematically illustrates a first configuration of the hybrid powertrain 10 intended for the vehicle 1 illustrated in FIG. 1 according to an embodiment of the present invention.

The hybrid powertrain 10:1 for the vehicle comprises an internal combustion engine ICE, such as for example a diesel engine, mechanically coupled via a torque converter TC to a respective member of planetary gear set PGS. Thus, the internal combustion engine is mechanically engaged to a respective member of planetary gear set PGS via the torque converter. In more detail the torque converter TC comprising a locking mechanism.

A torque converter is a device, typically a hydrodynamic fluid coupling, which is used to transfer rotating power from a prime mover, such as an internal combustion engine, to a rotating driven load. For land vehicles, the driven load may be a driveshaft that is connected through a differential or other gear arrangements to one or more wheels or other driving mechanisms of the vehicle. Some torque converters also include a locking mechanism that transfers engine speed directly to the transmission with no torque multiplication or speed variation. One characteristic of torque converters is their ability to multiply torque when there is a difference between the input speed to the converter from the engine and the output speed of the converter to the transmission.

According to an embodiment the hybrid powertrain may comprise a power source storage device (not shown), such as a battery arrangement or other suitable type of power storing device, coupled to one or more of the electric machines EMA, EMB. In more detail the power storage device may be arranged coupled to one or more of the respective electric machines via a DC-bus (not shown) to which the respective electric machines are coupled or via power electronics (not shown) coupled to the DC-bus. The addition of a power source results in a hybrid powertrain with improved characteristics and functions such as for example: increased torque capability by means of that one or more of the electric machines have access to power provided from the power storage without one of them being required to be used as generator; power storage capability for storing of excess power provided from one or more of the electric machines when operating as a generator; and electric braking capability.

The planetary gear set PGS comprises a conventional single stage planetary gear set. Thus, the planetary gear set PGS comprises a single planetary gear set comprising a first member RGM, a second member CSM and a third member SGM. The first member RGM is a ring gear member, the second member CSM is a carrier shaft member and the third member SGM is a sun gear member. Each of the first, second and third members are single members meaning that the planetary gear set comprises a single ring gear, a single carrier shaft and a single sun gear. This is unlike unconventional planetary gear sets which comprise multiple planetary gear set stages and/or multiples of one or more of the ring gear, carrier shaft or sun gear within each one or more planetary gear set stages.

In more detail a first mechanical path MP1 of the hybrid powertrain, configured for transferring of a rotating torque, is configured between the torque converter TC and the second member CSM of the planetary gear set PGS. This first mechanical path enables transferring a rotating torque generated by the internal combustion engine ICE via the torque converter TC to the second member CSM of the planetary gear set PGS.

The hybrid powertrain 10:1 further comprises a first and a second electric machine in the form of a first electric machine EMA and a second electric machine EMB. The first and second electric machines EMA, EMB are configured to selectively be operated as a motor and/or generator. The first and second electric machines are arranged electrically coupled to each other via an electrical path E1. By virtue of that the first and second electric machine being electrically coupled to each other exchange of electrical power between the electric machines becomes enabled meaning that the first electric machine, when operating as a generator, can provide electrical power to the second electric machine and that the second electric machine, when operating as a generator, can provide electrical power to the first electric machine. Thus, the electric machines are enabled to electrically power each other so as enable generation of a torque by means of using the electrical power and converting it to mechanical power, i.e. torque. In more detail to enable using one of the electric machine as a generator for supply of electric power to the other electric machine the electric machines may be electrically coupled to each other by means of power electronics (not shown) and a DC-bus (not shown). When an electric machine operates as a generator it provides an AC-voltage with a frequency being dependent on the number of poles and the number of revolutions of the electric machine. This AC-voltage provided by one of the electric machine being operated as a generator cannot directly be used by the other electric machine operating as a motor. For this reason the electric machine being used as a generator may be coupled to power electronics in the form of an AC to DC converter (not shown) arranged to convert the received AC-voltage, provided from the electric machine being operated as a generator, into a DC-voltage. The AC to DC converter may be coupled to a DC-bus for transport of the DC-voltage to power electronics in the form of a DC to AC converter with a frequency control mechanism being coupled to the electric machine being operated as a motor. By controlling the frequency of the AC-voltage provided to the electric machine being operated as a motor the AC-voltage can be adapted for use by the electric machine being operated as a motor.

The first electric machine EMA is arranged mechanically engaged, i.e. coupled, to the first member of the planetary gear set PGS, i.e. coupled to the ring gear. In more detail the first electric machine EMA is arranged mechanically coupled to the first member of the planetary gear set PGS via a second mechanical path MP2. The second electric machine EMB is arranged mechanically engagable to the second member CSM and the third member SGM of the planetary gear set PGS, i.e. arranged mechanically selectively engagable coupled to the carrier shaft and the sun gear. In more detail the second electric machine EMB is arranged mechanically engagable to the second member CSM and the third member SGM of the planetary gear set PGS via a respective third MP3 and fourth MP4 mechanical path. By mechanically selectively engagable is meant that the respective mechanical couplings between the second electric machine EMB and the planetary gear set can be controlledly so as to be enaged/disengaged. Thus, when a respective clutch is controlled to be engaged a mechanical path is established between the electric machine EMB and one or more of the respective member of the planetary gear set meaning that mechanical power, i.e. a rotating torque, can be transferred between, i.e. to and/or from, the second and/or third members of the planetary gear set and the second electric machine.

To enable the selectively engagable couplings between the second electric machines EMB and the second and third member of the planetary gear set PGS the hybrid powertrain comprises a first and a second clutch C1, C2. In more detail the second electric machine EMB is arranged engagable to the third member SGM of the planetary gear set PGS via the first clutch C1 and arranged engagable to the second member CSM of the planetary gear set via the second clutch C2.

In order to control the operation of the respective clutches C1, C2 so as to mechanically engage/disengage the second electric machine to the third member and second member of the planetary gear set the clutches may be coupled to an electronic control unit such as the electronic control unit ECU described with respect to FIG. 1.

Thus, according to the above described configuration of the hybrid powertrain the internal combustion engine is always mechanically coupled to the second member of the planetary gear set PGS via the torque converter TC, i.e. always coupled to the carrier shaft and the first electric machine EMA is always mechanically coupled to the first member RGM of the planetary gear set, i.e. the always coupled to the ring gear. The second electric machine EMB can selectively be coupled to the second planetary gear member, i.e. the carrier shaft, by means of engaging/disengaging the second clutch C2. The second electric machine EMB can further selectively be coupled to the third planetary gear member SGM, i.e. the sun gear, by means of engaging/disengaging the first clutch C1.

Accordingly, by means of the above explained configuration of the hybrid powertrain a number of operating modes of the hybrid powertrain are established. Entry into one or more of the plurality of operating modes of the hybrid powertrain is caused by controlling one or more of the clutches C1, C2 so as to controllably engage/disengage the second electric machine EMB to the second and/or third member of the planetary gear set. The above mentioned electronic control unit ECU may be configured to control the clutches C1, C2 for entry into a desired operating mode. The operating modes will be elaborated in more detail with respect to FIGS. 3, 4a, 4b, 4c and 4d.

The torque converter TC is provided with a lock up mechanism, configured to enable lock up of the torque converter. When the lock up mechanism is disengaged the torque converter actively converts torque provided from the internal combustion engine and when the lock up mechanism is disengaged the torque converter basically operates as a rigid axle i.e. provides no torque conversion. Thus, the torque converter is arranged, when the lock up mechanism is controlled to be disengaged, to convert the torque provided from the internal combustion engine in order to apply multiplication of torque so as to allow the internal combustion engine to operate within optimal operating ranges with respect to its working speed whilst providing a torque suitable for the operation of the vehicle. Control of the lock up mechanism of the torque converter may for example be operated by the electronic control unit ECU.

The output of the third member of the planetary gear set PGS is further coupled to a drive assembly DA for enabling providing a driving torque to ground engaging means, such the ground engaging means 5 as described with respect to FIG. 1. In more detail the third member of the planetary gear set PGS, i.e. the sun gear, is coupled to the drive assembly DA via a final output shaft S1, such as a drive shaft. According to a variant the sun gear SGM is coupled to drive assembly DA, being in the form of a fixed gearing formed between the sun gear and drive wheels arranged to drive endless tracks of a pair of track assemblies of a tracked vehicle. By means of the above described coupling of the electric machines and the internal combustion engine to the planetary gear set PGS, the planetary gear set provides a power split mechanism, i.e. provides as an output a splitting of power provided from the inputs in form of the electric machines and the internal combustion engine. Thus, the planetary gear set PGS constitutes a power split stage. By the above described coupling of the drive assembly DA to the sun gear of the planetary gear set PGS, i.e. arranging the sun gear to provide the output from the planetary gear set to the drive assembly such as by coupling the output of the sun gear via a drive shaft to the drive assembly, it becomes possible to selectively disconnect/connect the electric machines from/to the output of the planetary gear set, i.e. sun gear, which for example results in that the maximum allowed speed (rpm) of the electric machine(s) is not a factor limiting the maximum speed of the vehicle in which the hybrid powertrain is to be implemented.

It should be noted that the hybrid powertrain 10:1 may be configured differently than as described with reference to FIG. 2. For example the hybrid powertrain 10:1 may comprise one or more additional component with associated configuration such as for example one or more additional component with associated configuration as described with reference to FIG. 5. One example of such components that may easily be comprised in the hybrid powertrain are drop gears, as described with reference to FIG. 5.

Figure 3:
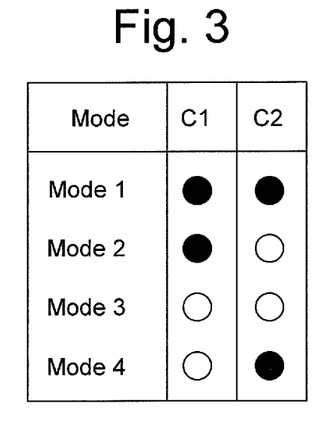
FIG. 3 schematically illustrates an engagement schedule of the hybrid powertrain according to an embodiment of the present invention.

FIG. 3 schematically illustrates an engagement schedule of the hybrid powertrain 10:1 described with reference to FIG. 2 or a hybrid powertrain described with reference to FIG. 5, i.e. hybrid powertrain 10:2.

The hybrid powertrain 10:1 or 10:2 is operable in four different operating modes M1-M4.

In FIG. 3 filled circles are used to illustrate engagement of one or more respective clutches C1, C2 and non-filled circles are used to illustrate disengagement of one or more respective clutches C1, C2. When a respective clutch C1, C2 is engaged a mechanical path is established between the second electric machine EMB and a respective member of the planetary gear set PGS so as to enable transferring of a torque from the second electric machine to the respective member of the planetary gear set and/or from the respective member of the planetary gear set to the second electric machine.

Figure 5:
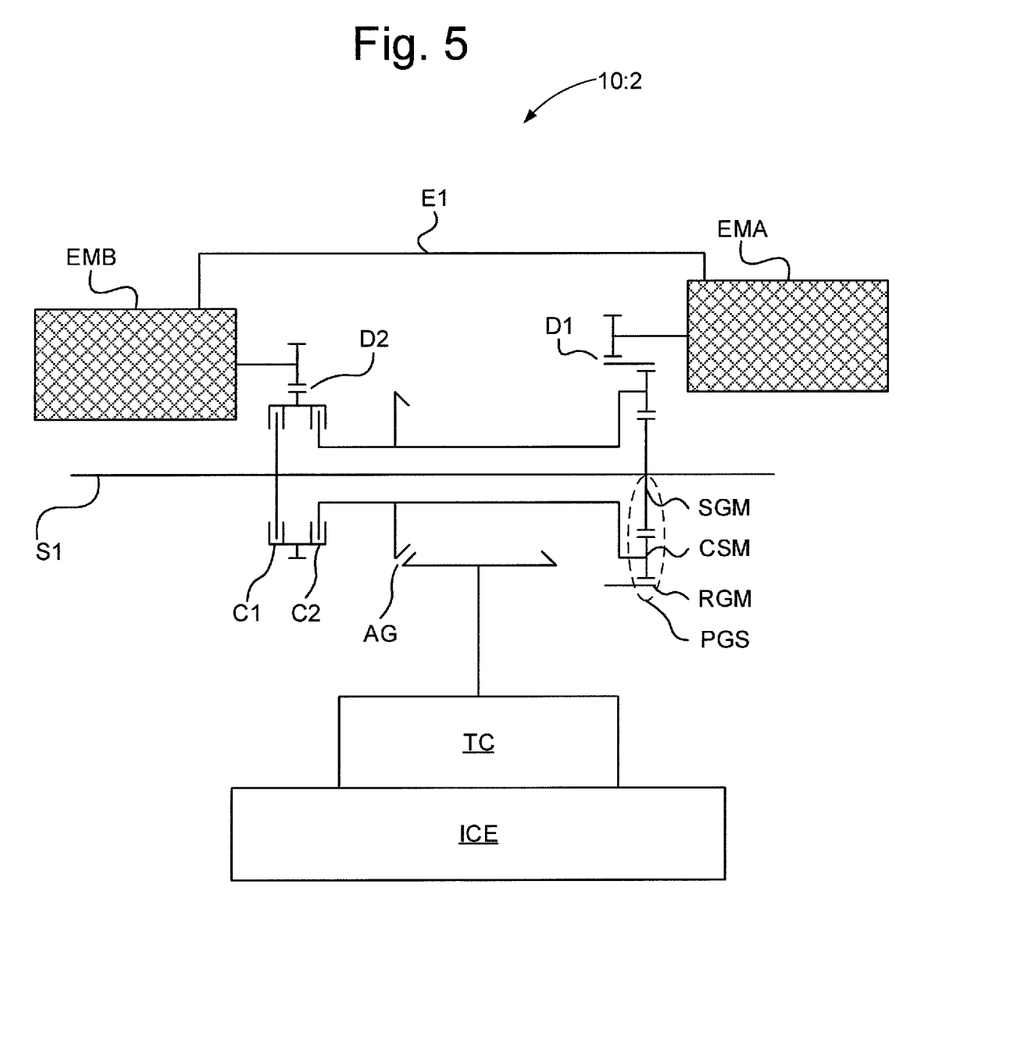
FIG. 5 schematically illustrates schematics of a hybrid powertrain of a vehicle according to an embodiment of the present invention.

In a first operating mode M1 the first and second clutches C1, C2, as described with reference to FIG. 2 or 5 are configured to be engaged.

In a second operating mode M2 the first clutch C1 is configured to be engaged and the second clutch C2 is configured to be disengaged.

In a third operating mode M3 the first clutch C1 and the second clutch C2 are configured to be disengaged.

In a fourth operating mode M4 the first clutch C1 is configured to be disengaged and the second clutch C2 are configured to be engaged.

Figure 4A:
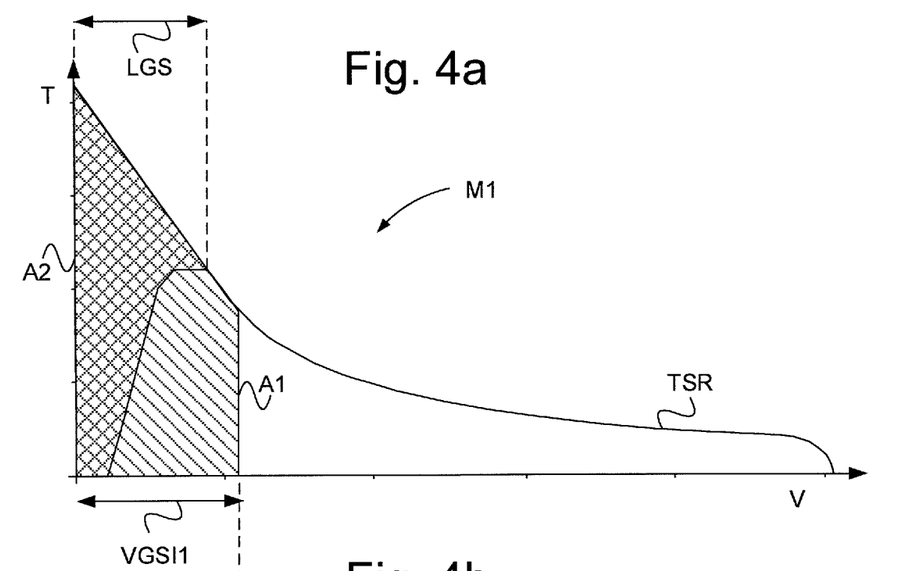
FIG. 4a schematically illustrates a graph showing exemplary operation with respect to vehicle torque and vehicle velocity of a first operating mode of the hybrid powertrain according to an embodiment of the present invention.

FIG. 4a schematically illustrates a first operational mode M1 of the hybrid powertrain 10:1 described with reference to FIG. 2 and the hybrid powertrain 10:2 described with reference to FIG. 5.

A torque speed ratios TSR curve is shown in FIG. 4a illustrating a desired vehicle operating performance curve, i.e. the curve shows different levels of maximum torque, i.e. powertrain output torque, for different vehicle ground travel speeds as required for satisfactory operation of the heavy vehicle. In FIG. 4a torque T is shown as a function of vehicle ground travel speed V.

In the first operational mode M1 the first clutch C1 and the second clutch C2 are configured to be engaged. Thus, entry into said first mode M1 is caused by controlling the first and second clutches C2, C1 to be engaged. By engaging the first and second clutches C1, C2 the second electric machine EMB becomes mechanically coupled to the second member CSM of the planetary gear set PGS, i.e. to the carrier shaft and mechanically coupled to the third member SGM of the planetary gear set PGS, i.e. to the sun gear. This result in that the planetary gear set PGS rotates as a single unit. During the first operational mode M1 both electrical machines EMA, EMB are configured to operate passively, i.e. none of them perform any work. Since the planetary gear set PGS, during the first operational mode, rotates as a single unit, upon the internal combustion engine providing torque to the second member CSM of the planetary gear set, meaning that each of the members of the planetary gear set rotates with the same speed both the first and the second electric machines of the hybrid powertrain 10:1, described with reference to FIG. 2, will rotate with the same speed as the planetary gear set. For the hybrid powertrain 10:2, described with reference to FIG. 5, the first and the second electric machines, wherein the first and electric machines are coupled to the planetary gear set via drop gears, will rotate with a respective speed being dependent of the common speed of the planetary gear members and the gear ratio of the drop gears.

Accordingly, the first operational mode M1 of the hybrid powertrain corresponds to a torque converter supported internal combustion engine only operational mode.

According to a variant additional torque apart from the torque provided by the internal combustion engine ICE and the torque converter can be added during the first operational mode M1 to the planetary gear set PGS by use of an electrical power storage device, as described with reference to the description associated with FIG. 2.

The first operational mode is arranged to be activated, such as for example activated automatically by the electronic control unit ECU described with reference to FIG. 2 or activated manually or semi-automatically with assistance from the electronic control unit upon selection by an operator of the vehicle, for causing desired performance characteristics of the vehicle during when the vehicle is travelling at a speed within a first vehicle speed interval VGSI1. In more detail the first vehicle speed interval relates to vehicle ground speed interval. The first vehicle speed interval VGSI1 comprises a speed interval ranging from approximately 0-20 km/h. According to a preferred variant, the first operating mode M1 is arranged to be activated when the vehicle is traveling at vehicle speeds within a speed interval ranging from approximately 0-16 km/h.

During the first operational mode M1 the lock up mechanism of the torque converter TC is arranged to be controlled to be disengaged for travelling in vehicle ground speeds within a low vehicle ground speed interval LGS. The low vehicle ground speed interval represents a lower portion of the first vehicle ground speed interval VSGI1. The lock up mechanism of the torque converter is further arranged to be disengaged for travelling at vehicle ground speeds of an upper portion of the first vehicle ground speed interval VSGI1. For said control of the lock up mechanism of the torque converter the electronic control unit ECU may be used. Thus, when the vehicle is travelling at low speeds within the low vehicle ground speed interval LGS the torque converter actively converts torque, i.e. provides torque multiplication, of the torque outputted from the internal combustion engine.

The torque speed ratios resulting from the hybrid powertrain operating in the first operational mode M1 can be seen in FIG. 4a illustrated as torque speed ratio regions A1, A2. A first torque speed ratio region A1 corresponds to the hybrid powertrain described with reference to FIG. 2 or FIG. 5 operating without active use of the torque converter TC, i.e. the lock up mechanism is engaged, or use of the alternative power source. Accordingly, by controlling the speed of the internal combustion engine, without support of the torque converter, vehicle ground travel speed dependent torque levels contained within the first torque speed ratio region A1 can be provided by the hybrid powertrain. Thus, as can be seen in FIG. 4a, the hybrid powertrain is not able to provide a sufficient amount of torque required for satisfactory vehicle performance of the heavy vehicle when the vehicle travels at ground speeds close to 0 km/h. Also, as can be seen in FIG. 4a, without active use of the torque converter the maximum torque required for satisfactory vehicle performance of the heavy vehicle, depending on different operating conditions of the vehicle, throughout the first vehicle speed interval VSGI1 is only satisfied for the upper speed portion of the first vehicle speed interval. In more detail these operating conditions may for example relate to current load of the vehicle, ground inclination, terrain conditions etc.

However, by making active use of the torque converter, i.e. by configuring the torque converter to be in a non-locked state so as to multiply torque provided from the internal combustion engine ICE the first torque speed ratio region A1 becomes expanded so that it also includes the vehicle ground travel speed dependent torque levels contained within a second torque speed ratio region A2. Thus, by means of active use of the torque converter the hybrid powertrain is able to provide satisfactory levels of torque throughout the entire first vehicle ground speed interval VGSI1.

Figure 4B:
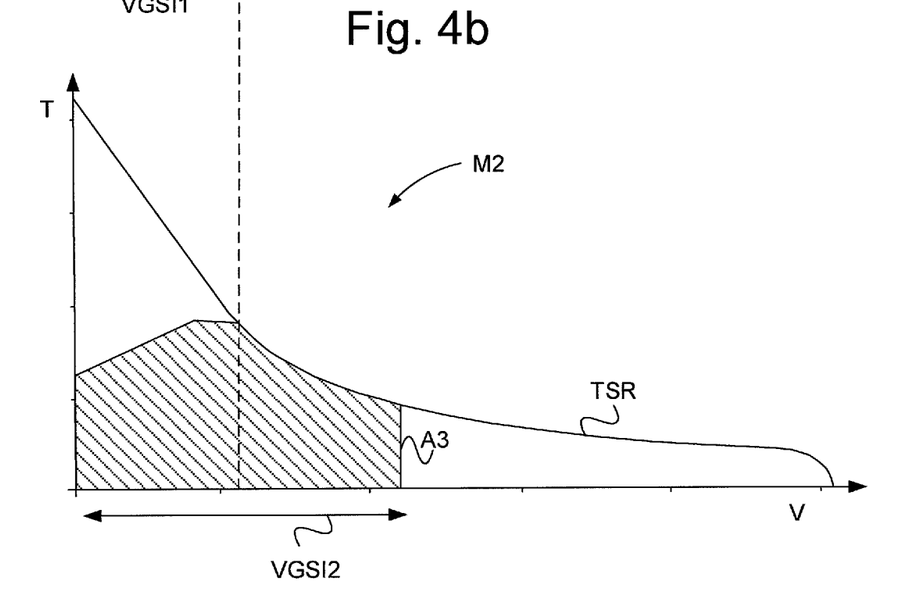
FIG. 4b schematically illustrates a graph showing exemplary operation with respect to vehicle torque and vehicle velocity of a second operating mode of the hybrid powertrain according to an embodiment of the present invention.

FIG. 4b schematically illustrates a second operational mode M2 of the hybrid powertrain 10:1 described with reference to FIG. 2 and the hybrid powertrain 10:2 described with reference to FIG. 5.

In FIG. 4b torque speed ratios TSR curve is shown corresponding to the torque speed ration curve described and illustrated with reference to FIG. 4a.

In the second operational mode M2 the first clutch C1 is configured engaged and the second clutch C2 is configured disengaged. By engaging the first clutch C1 and disengaging the second clutch C2 the second electric motor EMB becomes mechanically coupled to the third member of the planetary gear set PGS, i.e. the sun gear member SGM, and mechanically de-coupled from the second member of the planetary gear set PGS, i.e. de-coupled from the carrier shaft member CSM. This result in that the planetary gear set PGS substantially operates as a differential gear. During the second operational mode M2 the first electric machine EMA is arranged to operate as a generator and converts mechanical power received from the internal combustion engine via the planetary gear set into electrical power. During the second operational mode M2 the second electric machine EMB is arranged to operate as a motor by receiving electrical power generated by the first electric machine EMA, via the power electronics as described with reference to the description associated with FIG. 2. Thus, during the second operational mode M2 the second electric machine EMB converts electrical power provided from the first electric machine into mechanical power, i.e. torque, which is transferred to the final output shaft S1 via the third planetary gear member SGM. This means that both the internal combustion engine and the second electric machine provides torque for output from the planetary gear set.

The first electric machine is also during the second operational mode M2 arranged to maintain the speed, i.e. rotational speed, of the first planetary gear member RGM within a suitable speed region so as to allow adapting the speed of the internal combustion engine substantially independent from the current ground speed of the vehicle.

Accordingly, the second operational mode M2 of the hybrid powertrain corresponds to a combined internal combustion engine and electric machine operational mode.

The lock up mechanism of the torque converter TC is arranged to be engaged during the second operational mode M2.

The second operational mode is arranged to be activated, such as for example activated automatically by the electronic control unit ECU described with reference to FIG. 2 or activated manually or semi-automatically with assistance from the electronic control unit upon selection by an operator of the vehicle, for a second vehicle speed interval VGSI2. In more detail the second vehicle speed interval relates to vehicle ground speed interval. The second vehicle speed interval VGSI2 comprises a speed interval ranging from approximately 0-35 km/h. However, the torque that the hybrid powertrain is capable of delivering, during the second operational mode, is limited for lower speed regions of the second vehicle speed interval. Thus, according to a preferred variant, the second operating mode M2 is arranged to be activated when the vehicle is traveling at vehicle speeds within a speed interval ranging from approximately 16-33 km/h. By entry into the second operational mode, vehicle ground travel speed dependent torque levels contained within a third torque speed ratio region A3 can be provided by the hybrid powertrain.

Figure 4C:
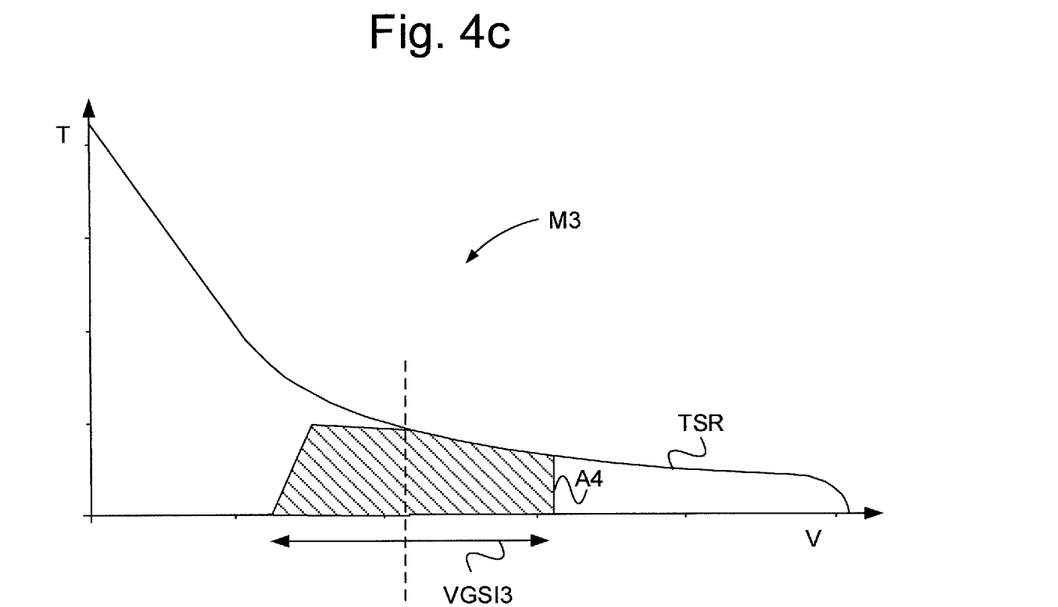
FIG. 4c schematically illustrates a graph showing exemplary operation with respect to vehicle torque and vehicle velocity of a third operating mode of the hybrid powertrain according to an embodiment of the present invention.

FIG. 4c schematically illustrates a third operational mode M3 of the hybrid powertrain 10:1 described with reference to FIG. 2 and the hybrid powertrain 10:2 described with reference to FIG. 5.

In FIG. 4c a torque speed ratios TSR curve is shown corresponding to the torque speed ration curve described and illustrated with reference to FIG. 4a In the third operational mode M3 the first clutch C1 and the second clutch C2 is configured disengaged. By disengaging the first clutch C1 and the second clutch C2 the second electric machine EMB becomes mechanically de-coupled from the second and third member of the planetary gear set PGS, i.e. de-coupled from the carrier shaft member and the sun gear member. This result in that the planetary gear set PGS substantially operates as a differential gear. During the third operational mode M3 the first electric machine EMA is arranged to maintain the speed of the first planetary gear member RGM near 0 rpm. This result in that very little electrical power is generated by the first electric motor EMA, whereby the second electric machine EMB can be decoupled from the planetary gear set, i.e. by disengaging the first and second clutches C1, C2. This also results in that the speed of the internal combustion engine directly dependent on the vehicle speed.

Accordingly, the third operational mode M3 of the hybrid powertrain corresponds to an electric machine assisted internal combustion engine only operational mode. In more detail all mechanical power for propulsion of the vehicle during the third operational mode M3 is provided from the internal combustion engine ICE via the planetary gear set PGS to the drive assembly DA but in order to enable entry into and maintaining the third operational mode the first electric machine EMA need to maintain the speed of the first planetary gear member RGM around 0 rpm, i.e. the first electric machine provide a torque for holding the first planetary gear member causing the speed of the first planetary gear member to be around 0 rpm. This torque provided from the first electric machine during the third operational mode is transferred via the first member of the planetary gear set to the output member of the planetary gear set, i.e. to the third member of the planetary gear set, but the speed of first member of the planetary gear is close to 0 rpm and therefore no or very low power is electrically generated. Accordingly, the third operational mode is an internal combustion only operational mode, i.e. all output effect from the hybrid powertrain comes from the internal combustion engine, but in order to enable entry into and maintaining the third operational mode the first electric machine provides assistance, i.e. maintains the speed of the first planetary gear set around 0 rpm. Thus, the term electric machine assisted internal combustion engine only operational mode differs from the term combined internal combustion engine and electric machine operational mode in that during the electric machine assisted internal combustion engine only operational mode only the internal combustion engine provides power for output from the hybrid powertrain whilst during the combined internal combustion engine and electric machine operational mode at least one electric machine in combination with the internal combustion engine provides power/torque for output from the hybrid powertrain.

The lock up mechanism of the torque converter TC is arranged to be engaged during the third operational mode M3.

Before entry into the third operational mode M3 the first electric machine EMA is arranged to bring down the speed of the first member of the planetary gear set to around 0 rpm where after the third operational mode can be entered.

The third operational mode is arranged to be activated, such as for example activated automatically by the electronic control unit ECU described with reference to FIG. 2 or activated manually or semi-automatically with assistance from the electronic control unit upon selection by an operator of the vehicle, for a third vehicle speed interval VGSI3. In more detail the third vehicle speed interval relates to vehicle ground speed interval. The third vehicle speed interval VGSI3 comprises a speed interval ranging from approximately 20-50 km/h. According to a preferred variant, the third operating mode M3 is arranged to be activated when the vehicle is traveling at vehicle speeds within a speed interval ranging from approximately 25-47 km/h.

By entry into the third operational mode, vehicle ground travel speed dependent torque levels contained within a fourth torque speed ratio region A4 can be provided by the hybrid powertrain.

Figure 4D:
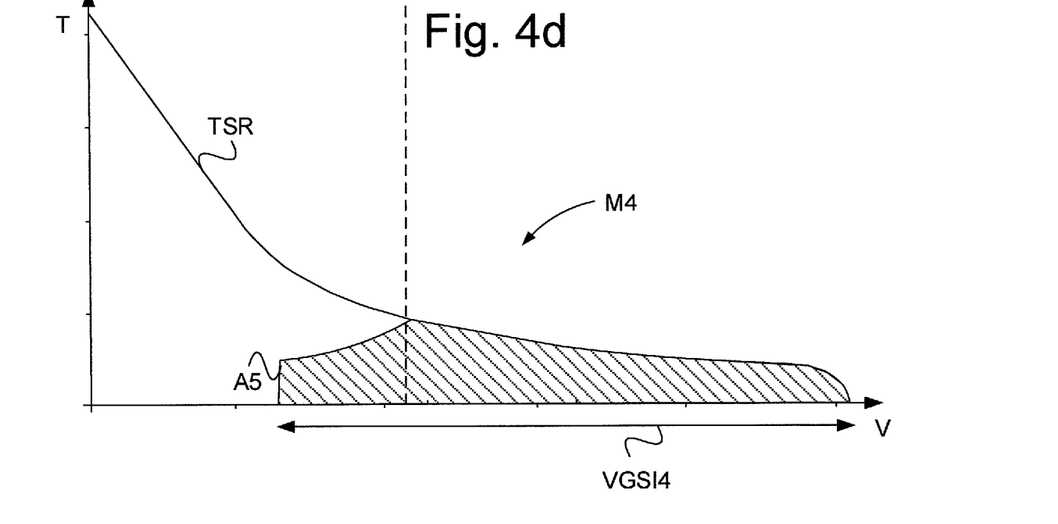
FIG. 4d schematically illustrates a graph showing exemplary operation with respect to vehicle torque and vehicle velocity of a fourth operating mode of the hybrid powertrain according to an embodiment of the present invention.

FIG. 4d schematically illustrates a fourth operational mode M4 of the hybrid powertrain 10:1 described with reference to FIG. 2 and the hybrid powertrain 10:2 described with reference to FIG. 5.

In FIG. 4d a torque speed ratios TSR curve is shown corresponding to the torque speed ration curve described and illustrated with reference to FIG. 4a.

In the fourth operational mode M4 the first clutch C1 is configured disengaged and the second clutch C2 is configured engaged. By disengaging the first clutch C1 and engaging the second clutch C2 the second electric motor EMB becomes mechanically coupled to the second member of the planetary gear set PGS and mechanically de-coupled from third member of the planetary gear set PGS, i.e. de-coupled from the sun gear member and coupled to the carrier shaft member. This result in that the planetary gear set PGS substantially operates as a differential gear. During the fourth operational mode the first electric machine EMA is arranged to operate as a motor and the second electric machine EMB is arranged to operate as a generator. Also the during the fourth operational mode the second electric machine EMB is arranged to generate electrical power to be provided to the first electric machine EMA. The first electric machine EMA is further arranged during the fourth operational mode to cause a negative speed in the first member RGM of the planetary gear set PGS. This means that both the internal combustion engine and the first electric machine, during the fourth operational mode are arranged to provide torque for output from the planetary gear set.

Accordingly, the fourth operational mode M4 of the hybrid powertrain corresponds to a combined internal combustion engine and electric machine operational mode.

The lock up mechanism of the torque converter TC is arranged to be engaged during the fourth operational mode M4.

The fourth operational mode M4 is arranged to be activated, such as for example activated automatically by the electronic control unit ECU described with reference to FIG. 2 or activated manually or semi-automatically with assistance from the electronic control unit upon selection by an operator of the vehicle, for a fourth vehicle speed interval VGSI4. In more detail the fourth vehicle speed interval relates to vehicle ground speed interval. The fourth vehicle speed interval VGSI4 comprises a speed interval ranging from approximately 20-75 km/h. According to a preferred variant, the fourth operating mode M4 is arranged to be activated when the vehicle is traveling at vehicle speeds within a speed interval ranging from approximately 30-75 km/h.

By entry into the fourth operational mode, vehicle ground travel speed dependent torque levels contained within a fifth torque speed ratio region A5 can be provided by the hybrid powertrain.

It should be noted that the torque speed ratios TSR curve and the associated vehicle ground speed intervals VGSI1-VGSI4 described with reference to FIGS. 4a-4d are dependent on the application, i.e. which type of heavy vehicle and/or what sort of operation the hybrid powertrain is intended for.

The torque speed ratios TSR curve and the associated vehicle ground speed intervals VGSI1-VGSI4 described with reference to FIGS. 4a-4d relate to an preferred embodiment of a hybrid powertrain intended for use in a heavy vehicle in the form of a tank weighing around 40 000 kg.

Different types of vehicles typically have different needs in terms of performance being dependent on vehicle related parameters such as for example vehicle weight, vehicle load, vehicle speed and acceleration.

Thus, the exemplary torque speed ratios TSR curves and vehicle ground speed intervals described with reference to FIGS. 4a-4d may be configured differently resulting in a different configuration of the hybrid powertrain. For example the electronic control unit ECU may be configured control the operation of the internal combustion engine, switching between the operational modes and/or control the operation of the lock up mechanism of the torque converter in a different fashion than described with reference to FIGS. 2, 4a-4d and 5.

Accordingly, the hybrid powertrain can easily be configured to be suitable for use with other vehicles than the tank exemplified with reference to FIGS. 4a-4d.

It should further be noted that the ground speed vehicle intervals VGSI1-VGSI4 in FIGS. 4a-4d overlaps to an extent. To determine when to perform transitions between the operational modes M1-M4 the electronic control unit ECU can be arranged to compare desired vehicle speed and torque required at the desired vehicle speed with torque speed ratio capacity of the hybrid powertrain as indicated by the vehicle ground speed intervals VGSI1-VGSI4 with the associated torque regions A1-A5. By performing this comparison the electronic control unit can determine when to shift/transition into a different operational mode than the currently selected operational mode and into which operational mode the shift should be performed.

FIG. 5 schematically illustrates a second configuration of a hybrid powertrain 10:2 intended for the vehicle illustrated in FIG. 1.

The hybrid powertrain 10:2 is configured in a similar fashion as the hybrid powertrain 10:1 described with reference to FIG. 2. It should be noted that some of the components of the hybrid powertrain 10:2 shown in FIG. 5 are illustrated using a different symbolic, i.e. using electromechanical circuit schematics instead of the block schematics used in FIG. 2. However, symbols of FIGS. 2 and 5 having the same references are intended relate to the same components. The hybrid powertrain 10:2, illustrated in FIG. 5, differs from the hybrid powertrain 10:1, illustrated in FIG. 2, in that the hybrid powertrain 10:2 of FIG. 2 comprises drop gears and a bevel gear.

Accordingly, the hybrid powertrain 10:2 comprises an internal combustion engine ICE coupled to a planetary gear set PGS via a torque converter TC, wherein the torque converter comprises a lock up mechanism.

The planetary gear set PGS comprises a first RGM, second CSM and third SGM member, wherein the first member comprises a ring gear member, the second member comprises a carrier shaft member and the third member comprises a sun gear member. The third member of the planetary gear set is arranged engaged to a final output shaft S1.

In more detail during operation of the hybrid powertrain 10:2 the internal combustion engine ICE is arranged to provide a rotational torque via the torque converter to the second member CSM of the planetary gear set. For this reason the internal combustion engine is arranged mechanically engaged via the torque converter to the second member of the planetary gear set. In more detail the internal combustion engine is arranged mechanically engaged via the torque converter being mechanically engaged to a bevel gear AG which is mechanically engaged to the second member of the planetary gear set.

The hybrid powertrain 10:2 further comprises a first electric machine EMA and a second electric machine EMB. The first and second electric machine are arranged electrically coupled to each other via an electrical path E1 so as to enable interchangeably, i.e. selectively, using one electric machine as a generator for generating and supplying electrical power to the other electric machine. This is described in more detail with reference to FIG. 2.

The first electric machine EMA is further arranged mechanically engaged to the first member RGM of the planetary gear set PGS via a first drop gear D1.

The second electric machine EMB is further arranged mechanically engagable to the second and third member of the planetary gear set via a second drop gear D2, a first clutch C1 and a second clutch C2. In more detail the second electric machine EMB is arranged mechanically engaged to the first and second clutches C1, C2 by means of being mechanically engaged to the second drop gear D2 which is mechanically engaged to the clutches. This results in that the second electric machine is mechanically engagable to the second and third member of the planetary gear set since the clutches allow engage/disengage the second electric machine to one or more of the second and third member of the planetary gear set. In more detail the second electric machine is arranged mechanically engagable to the third member SGM of the planetary gear set PGS via the first clutch C1. The second electric machine is arranged mechanically engagable to the second member CSM of the planetary gear set PGS via the second clutch C2. Thus, by controlling the first clutch to be engaged the second electric machine becomes mechanically engaged to the third member of the planetary gear set and by controlling the second clutch to be engaged the second electric machine becomes mechanically engaged to the second member of the planetary gear set. Furthermore, by controlling the first clutch to be disengaged the second electric machine becomes mechanically disengaged, i.e. decoupled, from the third member of the planetary gear set and by controlling the second clutch to be disengaged the second electric machine becomes mechanically disengaged from the second member of the planetary gear set.

By controlling the hybrid powertrain or in more detail by controlling the operation of clutches, the internal combustion engine and the electric machines a plurality of operational modes of the hybrid powertrain are established. These operational modes are described in more detail with reference to FIG. 3 and FIGS. 4a-4d. The plurality of operational modes in more detail comprises four operational modes M1-M4, in the form of a first operational mode M1, a second operational mode M2 a third operational mode M3 and a fourth operational mode M4.

Figure 6:
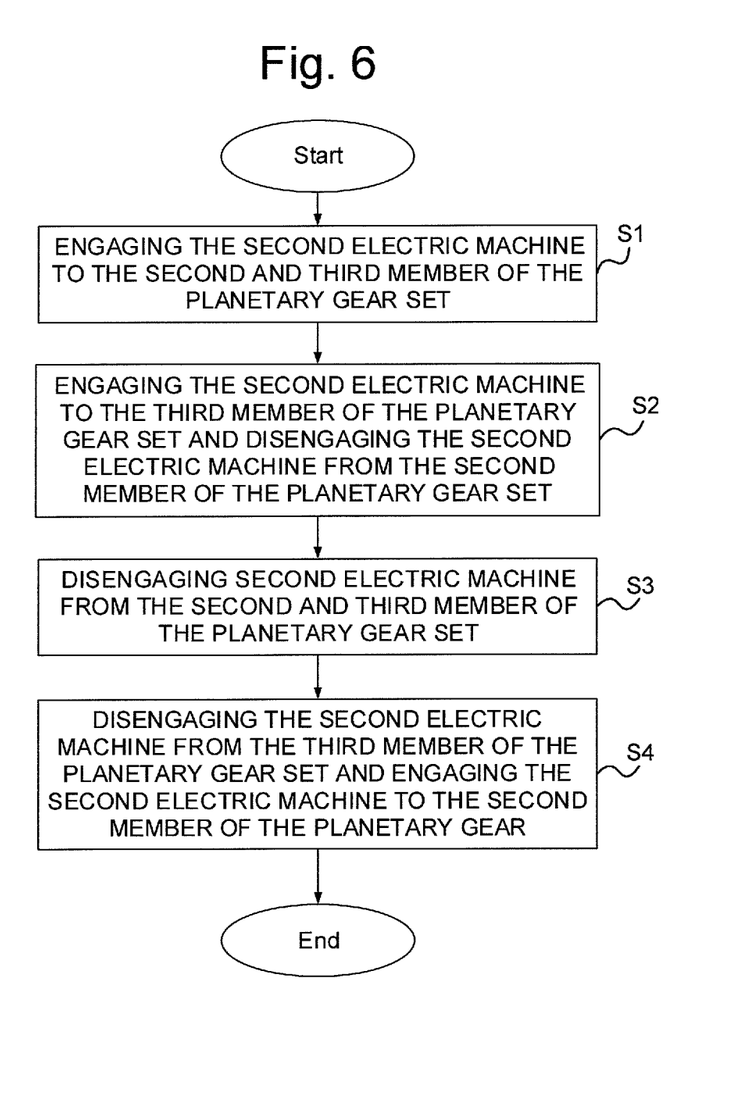
FIG. 6 schematically illustrates a flow diagram of a method for controlling a hybrid powertrain of a vehicle.

FIG. 6 schematically illustrates a flow diagram of a method for operating a hybrid powertrain 10:1, 10:2 as described with reference to FIGS. 2, 3, 4a-4d and 5 according to an embodiment of the present invention.

In a first step S1, the second electric machine EMB is engaged to the second CSM and third member SGM of the planetary gear set PGS. This results in entry into a first operational mode M1 of the hybrid powertrain 10:1, 10:2. The first operational mode corresponds to a torque converter supported internal combustion engine only operational mode. During the first operational mode the planetary gear set PGS rotates as single unit, i.e. the members RGM, CSM, SGM of the planetary gear set rotates with a common rotational speed.

The first operational mode is arranged to the entered for travelling in low vehicle ground speeds, i.e. first vehicle ground speed interval VSGI1, as described in more detail with reference to FIG. 4a. To increase torque capacity the lock mechanism of the torque converter TC is arranged to the configured disengaged for a lower speed region LSR of said first vehicle ground speed interval VSGI1 so that the torque converter support the internal combustion engine during this lower speed region LSR. For vehicle speeds within said first vehicle ground speed interval that are higher than said lower speed region the lock up mechanism is arranged to be configured engaged.

To cause the second electric machine EMB to be engaged to the second CSM and the third member SGM of the planetary gear set PGS the first and second clutches C1, C2 are controlled to be engaged.

In a second step S2, the second electric machine EMB is engaged to the third member SGM of the planetary gear set PGS and disengaged from the second member CSM of the planetary gear set PGS. This results in entry into a second operational mode M2 of the hybrid powertrain 10:1, 10:2. The second operational mode corresponds to a combined internal combustion engine and electric machine operational mode. In the second operational mode the first electric machine EMA is arranged to operate as a generator for supply of electrical power to the second electric machine EMB being arranged to operate as a motor for supply of mechanical torque to the planetary gear set so as to support the internal combustion engine ICE. This means that both the internal combustion engine ICE and the second electric machine EMB both provides mechanical torque to the planetary gear set PGS for output to the final output shaft S1. During this second operational mode the planetary gear set operate substantially as a differential gear. In more detail the first electric machine apart from being configured to work as a generator is also configured to control the speed of the first member of the planetary gear set within a suitable speed so as to allow the speed of the internal combustion engine to be controlled independently from the speed of the vehicle.

The second operational mode is arranged to the entered for travelling in low to moderate vehicle ground speeds, i.e. second vehicle ground speed interval VSGI2, as described in more detail with reference to FIG. 4b.

To cause the second electric machine EMB to be engaged to the third member SGM of the planetary gear set PGS and disengaged from the second member CSM of the planetary gear set PGS the first clutch C1 is controlled to be engaged and the second clutch C2 is controlled to be disengaged.

In a third step S3, the second electric machine EMB is disengaged from the second CSM and third member SGM of the planetary gear set PGS. This results in entry into a third operational mode M3 of the hybrid powertrain 10:1, 10:2. The third operational mode M3 corresponds to an electric machine assisted internal combustion engine only operational mode. During this third operational mode the planetary gear set operate substantially as a differential gear. Before entry into the third operational mode the first electric machine EMA is configured to control speed of the first member RGM of the planetary gear set so as to be close to 0 rpm. During the third operational mode first electric machine EMA is configured to control speed of the first member RGM of the planetary gear set so as to maintain the speed close to 0 rpm. This results in that very little electrical power is generated by the first electric machine during the third operational mode, whereby the second electric machine can be de-coupled from the planetary gear set. Thus, only the internal combustion engine ICE provides power to the planetary gear set during the third operational mode.

The third operational mode is arranged to the entered for travelling in moderate to high vehicle ground speeds, i.e. third vehicle ground speed interval VSGI3, as described in more detail with reference to FIG. 4c.

To cause the second electric machine EMB to be disengaged from the second CSM and third member SGM of the planetary gear set PGS the first and second clutches C1, C2 are controlled to be disengaged.

In a fourth step S4, the second electric machine EMB is disengaged from the third member SGM of the planetary gear set and engaged to the second member CSM of the planetary gear set PGS. This results in entry into a fourth operational mode M4 of the hybrid powertrain 10:1, 10:2. The fourth operational mode M4 corresponds to a combined internal combustion engine and electric machine operational mode. During this fourth operational mode the planetary gear set operate substantially as a differential gear. During the fourth operational mode the first electric machine EMA operates as a motor supplied with electrical power from the second electric machine EMB operating as a generator, wherein said second electric machine receives mechanical power from the internal combustion engine via the planetary gear set for conversion into electrical power by the second electric machine. The first electric machine is further during the fourth operational mode arranged to cause a negative speed, i.e. speed in opposite rotational direction, in the first member RGM of the planetary gear set. It should be noted that all statements throughout this detailed description with regard to speed related to the members of the planetary gear set not preceded by the term negative are intended to relate to a positive speed.

The fourth operational mode is arranged to the entered for travelling in high vehicle ground speeds, i.e. fourth vehicle ground speed interval VSGI4, as described in more detail with reference to FIG. 4d.

To cause the second electric machine EMB to be disengaged from the third member SGM of the planetary gear set and engaged to the second member CSM of the planetary gear set PGS, the first clutch is controlled to be disengaged and the second clutch is controlled to be engaged.

After the step S4 the method may end or be continued by performing any suitable sequence of the steps S1-S4 for causing desired operation of the heavy vehicle comprising the hybrid powertrain 10:1, 10:2.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A hybrid powertrain for a vehicle, said hybrid powertrain comprising:
   an internal combustion engine (ICE);
   a torque converter (TC);
   a first and a second electric machine (EMA, EMB) electrically coupled to each other; and
   a planetary gear set (PGS), comprising a first (RGM), a second (CSM) and a third member (SGM), wherein the internal combustion engine is mechanically engaged to the second member of the planetary gear set via the torque converter, the first electric machine (EMA) is arranged mechanically engaged to the first member of the planetary gear set, the second electric machine (EMB) is arranged mechanically engagable to the second and third member of the planetary gear set so as to establish a plurality of operational modes of the hybrid powertrain.

2. The hybrid powertrain according to claim 1, wherein entry into one or more operational modes of the plurality of operational modes of the hybrid powertrain are caused by engaging the second electric machine to the second and/or third member of the planetary gear set.

3. The hybrid powertrain according to claim 2, wherein the second electric machine (EMB) is arranged mechanically engagable to the third member (SGM) of the planetary gear set (PGS) via a first clutch (C1) and arranged mechanically engagable to the second member (CSM) of the planetary gear set (PGS) via a second clutch (C2).

4. The hybrid powertrain according to claim 3, wherein the plurality of operational modes comprises a first operational mode (M1), caused by engaging the first and second clutches, wherein the planetary gear set is arranged to rotate as single unit, the first operational mode correspond to a torque converter supported internal combustion engine only operational mode.

5. The hybrid powertrain according to claim 4, wherein the plurality of operational modes comprises a second operational mode (M2), caused by engaging the first clutch and disengaging the second clutch, wherein the first electric machine (EMA) is arranged to operate as a generator and the second electric machine (EMB) is arranged to operate as an motor, and wherein the planetary gear set is arranged to operate substantially as a differential gear, the second operational mode (M2) correspond to a combined internal combustion engine and electric machine operational mode.

6. The hybrid powertrain according to claim 5, wherein the plurality of operational modes comprises a third operational mode (M3) caused by disengaging the first and second clutches, wherein the planetary gear set is arranged to operate substantially as a differential gear, the third operational mode (M3) correspond to an electric machine assisted internal combustion engine only operational mode.

7. The hybrid powertrain according to claim 6, wherein the plurality of operational modes comprises a fourth operational mode (M4) caused by disengaging the first clutch and engaging the second clutch wherein the first electric machine (EMA) is arranged to operate as a motor and the second electric machine (EMB) is arranged to operate as a generator, and wherein the planetary gear set is arranged to operate substantially as a differential gear, the fourth operational mode (M4) correspond to a combined internal combustion engine and electric machine operational mode.

8. The hybrid powertrain according to claim 1, wherein the first member of the planetary gear set is a ring gear, the second member is a carrier shaft and the third member is a sun gear.

9. The hybrid powertrain according to claim 1, wherein the third member of the planetary is coupled to an output member (S1, DA) for transferring of a driving torque from the hybrid powertrain to the vehicle.

10. The hybrid powertrain according to claim 1, wherein each of the first and second electric machine is configured to selectively be used as motor or generator.

11. The hybrid powertrain according to claim 1, comprising a power source.

12. The hybrid powertrain according to claim 1, wherein the planetary gear set is a single planetary gear set.

13. The hybrid powertrain according to claim 1, wherein the torque converter (TC) comprises a lock up mechanism so as to allow selective use of the torque converter.

14. A method for operating the hybrid powertrain according to claim 1, the method comprising the steps of:

engaging the second electric machine (EMB) to the second (CSM) and third member (SGM) of the planetary gear set (PGS) causing entry into a first operational mode (M1), wherein the planetary gear set rotates as single unit, the first operational mode corresponding to a torque converter supported internal combustion engine only operational mode;

engaging the second electric machine (EMB) to the third member of the planetary gear set and disengaging the second electric machine from the second member of the planetary gear set causing entry into a second operational mode (M2), wherein the planetary gear set substantially operates as a differential gear, and wherein the first electric machine (EMA) operates as a generator and the second electric machine (EMB) operates as a motor, the second operational mode corresponding to a combined internal combustion engine and electric machine operational mode;

disengaging second electric machine (EMB) from the second and third member of the planetary gear set causing entry into a third operational mode (M3), wherein the planetary gear set substantially operates as a differential gear, and the third operational mode (M3) corresponding to an electric machine assisted internal combustion engine only operational mode; and disengaging the second electric machine from the third member of the planetary gear set and engaging the second electric machine to the second member of the planetary gear set causing entry into a fourth operational mode (M4), wherein the planetary gear set substantially operate as a differential gear, and wherein the first electric machine (EMA) operates as a motor and the second electric machine (EMB) operates as a generator, the fourth operational mode (M4) corresponding to a combined internal combustion engine and electric machine operational mode.

15. A vehicle comprising a hybrid powertrain according to claim 1.

16. The vehicle according to claim 15, wherein said vehicle is a heavy vehicle.

\* \* \* \* \*